United States Patent
Howard et al.

(10) Patent No.: US 11,131,631 B2
(45) Date of Patent: Sep. 28, 2021

(54) SUPER-RESOLUTION FLUORESCENCE MICROSCOPY BY STEPWISE OPTICAL SATURATION

(71) Applicant: UNIVERSITY OF NOTRE DAME DU LAC, Notre Dame, IN (US)

(72) Inventors: Scott S. Howard, Notre Dame, IN (US); Yide Zhang, Notre Dame, IN (US); Cody J. Smith, Notre Dame, IN (US)

(73) Assignee: UNIVERSITY OF NOTRE DAME DU LAC, Notre Dame, IN (US)

( * ) Notice: Subject to any disclaimer, the term of this patent is extended or adjusted under 35 U.S.C. 154(b) by 5 days.

(21) Appl. No.: 16/757,634

(22) PCT Filed: Dec. 28, 2018

(86) PCT No.: PCT/US2018/067905
§ 371 (c)(1),
(2) Date: Apr. 20, 2020

(87) PCT Pub. No.: WO2019/133837
PCT Pub. Date: Jul. 4, 2019

(65) Prior Publication Data
US 2020/0333251 A1    Oct. 22, 2020

Related U.S. Application Data

(60) Provisional application No. 62/722,606, filed on Aug. 24, 2018, provisional application No. 62/611,447, filed on Dec. 28, 2017.

(51) Int. Cl.
*G02B 21/00*    (2006.01)
*G01N 21/64*    (2006.01)
*G02B 21/36*    (2006.01)

(52) U.S. Cl.
CPC ..... *G01N 21/6458* (2013.01); *G02B 21/0072* (2013.01); *G02B 21/0076* (2013.01); *G02B 21/367* (2013.01)

(58) Field of Classification Search
CPC ............ G01N 21/6458; G02B 21/0072; G02B 21/0076; G02B 21/367
See application file for complete search history.

(56) References Cited

U.S. PATENT DOCUMENTS 10,281,701 B2 * 5/2019 Kleppe ............... G02B 6/06
10,317,657 B2 * 6/2019 Kleppe ............... G02B 15/142
(Continued)

OTHER PUBLICATIONS

Alexander et al., "Image registration and averaging of low laser power two-photon fluorescence images of mouse retina," Biomed. Opt. Express, Jul. 2016, 7(7): 2671-2691.
(Continued)

*Primary Examiner* — David P Porta
*Assistant Examiner* — Djura Malevic
(74) *Attorney, Agent, or Firm* — Michael Best & Friedrich LLP

(57) ABSTRACT

A microscopy method and system includes obtaining a plurality of raw fluorescence images, respective ones of the plurality of raw fluorescence images obtained by exciting a sample using a light source at a respective irradiance value in a weak saturation region of the sample, and capturing the respective raw fluorescence image; applying a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained; and linearly combining the plurality of weighted fluorescence images, thereby generating the output image having a reso-
(Continued)

lution greater than a diffraction limit. Respective raw fluorescence images correspond to irradiance values different from one another.

17 Claims, 9 Drawing Sheets

(56) References Cited

U.S. PATENT DOCUMENTS

| | | | |
|---|---|---|---|
| 2012/0061590 A1 | 3/2012 | Khojasteh et al. | |
| 2012/0194646 A1 | 8/2012 | Chiang et al. | |
| 2013/0126756 A1* | 5/2013 | Xu | G02B 21/16 250/459.1 |
| 2014/0378843 A1* | 12/2014 | Valdes | G02B 21/36 600/476 |
| 2017/0290515 A1* | 10/2017 | Butte | G01J 3/4406 |
| 2017/0370843 A1* | 12/2017 | Marcu | A61B 5/0077 |
| 2018/0214062 A1* | 8/2018 | Keating | G01J 1/44 |
| 2019/0099081 A1* | 4/2019 | Horesh | A61B 1/043 |

OTHER PUBLICATIONS

Balzarotti et al., "Nanometer resolution imaging and tracking of fluorescent molecules with minimal photon fluxes," Science, Feb. 2017, 355(6325): 606-612.

Bernas et al., "Loss of image quality in photobleaching during microscopic imaging of fluorescent probes bound to chromatin," J. Biomed. Opt., Nov. 2005, 10(6): 064015, 9 pages.

Betzig et al., "Imaging intracellular fluorescent proteins at nanometer resolution," Science, Sep. 2006, 313(5793): 1642-1645.

Biggs et al., "Acceleration of interative image restoration algorithms," Appl. Opt., Mar. 1997, 36(8): 1766-1775.

Case et al., Adhesive F-Actin waves: A novel Integrin-Mediated adhesion complex coupled to ventral actin polymerization, PLoS One, Nov. 2011, 6(11): e26631, 13 pages.

Chen et al., "A Wnt-planar polarity pathway instructs neurite branching by restricting F-actin assembly through endosomal signaling," PLoS Genet., 2017, 13(4): e1006720, 21 pages.

Chen et al., "Expansion microscopy," Science, Jan. 2015, 347(6221): 543-548.

Chen et al., "Ganglioside/calmodulin kinase II signal inducing cdc42-mediated neuronal actin reorganization," Neuroscience, Aug. 2003, 120(1): 163-176.

Chozinski et al., "Expansion microscopy with conventional antibodies and fluorescent proteins," Nat. Methods, Jun. 2016, 13(6): 485-488.

Cianci et al., "Saturation modified point spread functions in two-photon microscopy," Microsc. Res. Tech., Jun. 2004, 64(2): 135-141.

Cole et al., "Measuring and interpreting point spread functions to determine confocal microscope resolution and ensure quality control," Nat. Protoc. Nature Publishing Group, Nov. 2011, 6(12): 1929-1941.

Denk et al., "Two-photon laser scanning fluroscence microscopy," Science, Apr. 1990, 248(4951): 73-76.

D'Este et al., "STED Nanoscopy reveals the Ubiquity of Subcortical Cytoskeleton Periodicity in Living Neurons," Cell Rep., Cell Press, Mar. 2015, 10(8): 1246-1251.

Di Martino et al., "The microenvironment controls invadosome plasticity," J. Cell Sci., May 2016, 129(9): 1759-68.

Dumontier et al., "Rac1 GTPases control filopodia formation, cell motility, endocytosis, cytokinesis and development in Dictyostelium," J. Cell Sci., May 2000, 113(Pt 1): 2253-2265.

Eggeling et al., "Molecular photobleaching kinetics of rhodamine 6G by one-and two-photon induced confocal fluorescence microscopy," ChemPhysChem, May 2005, 6(5): 791-804.

Egner et al., "Fast 100-nm resolution three-dimensional microscope reveals structural plasticity of mitochondria in live yeast," Proc. Natl. Acad. Sci. USA, Mar. 2002, 99(6): 3370-3375.

Field et al., "Superresolved multiphoton microscopy with spatial frequency-modulated imaging," Proc. Natl. Acad. Sci. USA, Jun. 2016, 113(24): 6605-6610.

Flynn et al., "Growth cone-like waves transport actin and promote axonogenesis and neurite branching," Dev. Neurobiol., Wiley-Blackwell, Oct. 2009, 69(12): 761-779.

Freifeld et al., "Expansion microscopy of zebrafish for neuroscience and developmental biology studies," Proc. Natl. Acad. Sci., Nov. 2017, 114(50): 201706281, 10 pages.

Fujita et al., "High-resolution confocal microscopy by saturated excitation of fluorescence," Phys. Rev. Lett., Nov. 2007, 99: 228105, 4 pages.

Gallo, "Localized regulation of the axon shaft during the emergence of collateral branches," Neural Regeneration Research, Aug. 2015, 10(8): 1206-1208.

Ganguly et al., "A dynamic formin-dependent deep F-actin network in axons," J. Cell Biol., Rockefeller University Press, Jul. 2015, 210(3): 401-417.

Gatzogiannis et al., "Observation of frequency-domain fluorescence anomalous phase advance due to dark-state hysteresis," J. Phys. Chem. Lett., Feb. 2011, 2: 461-466.

Gerritsen et al., "Fluorescence lifetime imaging in scanning microscopy," Handbook of Biological Confocal Microscopy, Springer US, Boston, MA, 2006, 3rd Edition, Chapter 27, pp. 516-534.

Gigan, "Optical microscopy aims deep," Nat. Photonics, Jan. 2017, 11: 14-16.

Gustafsson, "Nonlinear structure-illumination microscopy: Widefield fluorescence imaging with theoretically unlimited resolution," Proc. Natl. Acad. Sci. USA, Sep. 2005, 102(37): 13081-13086.

Gustafsson, "Surpassing the lateral resolution limit by a factor of two using structured illumination microscopy," J. Microsc., May 2000, 198(Pt 2): 82-87.

Heap et al., "Cerebellar Output in Zebrafish: An Analysis of Spatial Patterns and Topography in Eurydendroid Cell Projections," Front. Neural. Circuits, Frontiers, Apr. 2013, 7: 53, 14 pages.

Helker et al., "The zebrafish common cardinal veins develop by a novel mechanism: lumen ensheathment," Development, Oxford University Press for The Company of Biologist Limited, Jul. 2013, 140(13): 2776-86.

Hell et al., "Breaking the diffraction resolution limit by stimulated emission: stimulated-emission-depletion fluorescence microscopy," Opt. Lett., Jun. 1994, 19(11): 780-782.

Hell, "Far-field optical nanoscopy," Science, May 2007, 316(5828): 1153-1158.

Hewlett et al., "Resolution enhancement in three-dimensional confocal microscopy," Mach. Vis. Appl., Sep. 1991, 4: 233-242.

Hines et al., "Neuronal activity biases axon selection for myelination in vivo," Nat. Neurosci, May 2015, 18(5): 683-689.

Hofmann et al., "Breaking the diffraction barrier in fluorescence microscopy at low light intensities by using reversibly photoswitchable proteins," Proc. Natl. Acad. Sci. USA, Dec. 2005, 102(49): 17565-17569.

Holmes et al., "Blind Deconvolution," Handbook of Biological Confocal Microscopy, Boston, MA, Springer US, 2006, pp. 468-487.

Hoover et al., "Advances in multiphoton microscopy technology," Nat. Photonics, Feb. 2013, 7(2): 93-101.

Hsia et al., "Differential regulation of cell motility and invasion by FAK," J. Cell Biol., Mar. 2003, 160(5):753-67.

Humpolíčková et al., "Optical saturation as a versatile tool to enhance resolution in confocal microscopy," Biophys. J., Nov. 2009, 97, 2623-2629.

Inagaki et al., "Actin Waves: Origins of Cell Polarization and Migration?" Trends in Cell Biology, Mar. 2017, 27(7): 515-526.

Inagaki et al., "Systems biology of symetry breaking during neuronal polarity formation," Dev. Neurobiol., Wiley-Blackwell, Jun. 2011, 71(6): 584-593.

Kalil et al., "Branch management: Mechanisms of axon branching in the developing vertebrate CNS," Nature Reviews Neuroscience, Nature Publishing Group, Jun. 2014, 15(1): 7-18.

Kang et al., "A multigenic program mediating breast cancer metastasis to bone," Cancer Cell, Jun. 2003, 3(6):537-49.

(56) References Cited

OTHER PUBLICATIONS

Khan et al., "Easily prepared ruthenium-complex nanomicelle probes for two-photon quantitative imaging of oxygen in aqueous media," RSC Adv., 2015, 5: 291-300.
Klar et al., "Fluorescence microscopy with diffraction resolution barrier broken by stimulated emission," Proc. Natl. Acad. Sci. USA, Jul. 2000, 97(15): 8206-8210.
Kuang et al., "Breaking the diffraction barrier using fluorescence emission difference microscopy," Sc. Rep., Mar. 2013, 3, 1441, 6 pages.
Kucenas et al., "CNS-derived glia ensheath peripheral nerves and mediate motor root development," Nat. Neurosci., Feb. 2008, 11(2): 143-151.
Larson, "Water-soluble quantum dots for multiphoton fluorescence imaging in vivo," Science, May 2003, 300(5624): 1434-1436.
Leterrier et al., "The nano-architecture of the axonal cytoskeleton," Nature Reviews Neuroscience, Dec. 2017, 18(12): 713-726.
Liu et al., "Observing the cell inits native state: Imaging subcellular dynamics in multicellular organisms," Science, Apr. 2018, 360(6386):eaaq1392.
MacDonald et al., "Does Super-Resolution Fluorescence Microscopy Obsolete Previous Microscopic Approaches to Protein Co-localization?" Methods in Molecular Biology, New York, NY, Springer New York, 2015, 1270: 255-275.
Mao et al., "Filopodia Conduct Target Selection in Cortical Neurons Using Differences in Signal Kinetics of a Single Kinase," Neuron, Elsevier, Inc., May 2018, 98: 1-16.
McCaig, "Nerve growth in the absence of growth cone filopodia and the effects of a small applied electric field," J. Cell Sci., Aug. 1989, 93(Pt 4): 715-21.
McNally et al., "Three-Dimensional Imaging by Deconvolution Microscopy," Methods, Nov. 1999, 19(3): 373-385.
Murphy et al., "A Src-Tks5 Pathway is Required for Neural Crest Cell Migration during Embryonic Development," PLoS One, Jul. 2011, 6: e22499, 13 pages.
Murphy et al., "The "ins" and "outs" of podosomes and invadopodia: Characteristics, formation and function," Nature Reviews Cell Biology, Jun. 2011, 12(7): 413-426.
Nallathamby et al., "New surface radiolabeling schemes of super paramagnetic iron oxide nanoparticles (SPIONs) for biodistribution studies," Nanoscale, Apr. 2015, 7(15): 6545-6555.
Nallathamby et al., "Preparation of fluorescent Au—SiO2 core-shell nanoparticles and nanorods with tunable silica shell thickness and surface modification for immunotargeting," J. Mater. Chem. B, Jul. 2016, 4: 5418-5428.
Nguyen et al., "3D super-resolved in vitro multiphoton microscopy by saturation of excitation," Opt. Express, Aug. 2015, 23(17): 22667-22675.
Oketani et al., "Saturated two-photon excitation fluorescence microscopy with core-ring illumination," Optics Letters, Feb. 2017, 42(3): 571-574.
Pan et al., "Regulation and dysregulation of axon infrastructure by myelinating glia," J. Cell Biol., Dec. 2017, 216(12): 3903-3916.
Rittweger et al., "STED microscopy reveal crystal colour centres with nanometric resolution," Nat. Photonics, Feb. 2009, 3: 144-147.
Roy, "Waves, rings and trails: The scenic landscape of axonal actin," J. Cell Biol., Jan. 2016, 212(2): 131-134.
Rust et al., "Sub-diffraction-limit imaging by stochastic optical reconstruction microscopy (STORM)," Nat. Methods, Oct. 2006, 3(10): 793-796.
Sage et al., "DeconvolutionLab2: An open-source software for deconvolution microscopy," Methods, Elsevier Inc., Feb. 2017, 115: 28-41.
Santiago-Medina et al., "Regulation of ECM degradation and axon guidance by growth cone invadosomes," Development, Feb. 2015, 142(3): 486-496.
Schulz et al., "Resolution doubling in fluorescence microscopy with confocal spinning-disk image scanning microscopy," Proc. Natl. Acad. Sci. USA, Dec. 2013, 110(52): 21000-5.
Sheppard et al., "Image formation in two-photon fluorescence microscopy," Optik, Jan. 1990, 86(3): 104-106.
Sheppard et al., "Imaging in high-aperture optical systems," J. Opt. Soc. Am. A, 1987, 4(8): 1354-1360.
Sheppard et al., "Superresolution by image scanning microscopy using pixel reassignment," Opt. Lett. Optical Society of America, Aug. 2013, 38(15): 2889-92.
Smith et al., "TNFa/TNFR2 signaling is required for glial ensheathment at the dorsal root entry zone," PLoS Genet., Apr. 2017, 13(4): e1006712, 23 pages.
Spillane et al., "Nerve growth factor-induced formation of axonal filopodia and collateral branches involves the intra-axonal synthesis of regulators of the actin-nucleating Arp2/3 complex," J. Nerosci., Society of Neuroscience, Dec. 2012, 32(49): 17671-86.
Stanfield, "Cells with filopodia cultured from human synovialis," Anat. Rec., Wiley-Blackwell, Jan. 1966, 154(1): 73-79.
Strauss et al., "3D-SIM Super Resolution Microscopy Reveals a Bread-Like Arrangement for FtsZ and the Division Machinery: Implication for Triggering Cytokinesis," PLoS Biol., Sep. 2012, 10(9): e1001389, 17 pages.
Tønnesen et al., "Super-Resolution Imaging of the Extracellular Space in Living Brain Tissue," Cell, Feb. 2018, 172: 1108-1121.
Toriyama et al., "A diffusion-based neurite length-sensing mechanism involved in neuronal symmetry breaking," Mol. Syst. Biol., European Molecular Biology Organization, Jul. 2010, 6: 394, 16 pages.
Veres et al., "Dendritic cell-nerve clusters are sites of T cell proliferation in allergic airway inflammation," Am. J. Pathol., Mar. 2009, 174(3): 808-817.
Vigil et al., "Description of deep saturated excitation multiphoton microscopy for super resolution imaging," J. Opt. Soc. Am., Jun. 2017, 34, 1217-1223.
Vogelsang et al., "A reducing and oxidizing system minimizes photobleaching and blinking of fluorescent dyes," Angew. Chem. Int. Edit., 2008, 47(29): 5465-5469.
Wang et al., "Volume labeling with Alexa Fluor dyes and surface functionalization of highly sensitive fluorescent silica (SiO2) nanoparticles," Nanoscale, Sep. 2013, 5(21): 10369-10375.
Watabe-Uchida et al., "The Rac Activator DOCK7 Regulates Neuronal Polarity through Local Phosphorylation of Stathmin/Op18," Neuron, Cell Press, Sep. 2006, 51(6): 727-739.
Winans et al., "Waves of actin and microtubule polymeration drive microtubule-based transport and neurite growth before single axon formation," eLife, Feb. 2016, 5: e12387, 22 pages.
Winter et al., "Two-photon instant structured illumination microscopy improves the depth penetration of super-resolution imaging in thick scattering samples," Optica, Sep. 2014, 1(3): 181-191.
Xu et al., "Measurement of two-photon excitation cross sections of molecular fluorophores with data from 690 to 1050 nm," J. Opt. Soc. Am. B, Mar. 1996, 13(3): 481-491.
Yonemaru et al., "Saturated excitation microscopy with optimized excitation modulation, " ChemPhysChem, Feb. 2014, 15(4): 743-749.
Yoshida et al., "Multispectral imaging of absorption and scattering properties of in vivo exposed rat brain using a digital red-green-blue camera," J. Biomed. Opt., Jan. 2015, 20(5): 051026, 15 pages.
Zhang et al., "Doubling the sensitivity of multiphoton frequency-domain fluorescence lifetime images," Conference on Lasers and Electro-Optics (CLEO), OSA, 2017, p. SM3C.6.
Zhang et al., "Generalized stepwise optical saturation enables super-resolution fluorescence lifetime imaging microscopy," Biomedical Optics Express, Sep. 2018, 9(9): 4077-4093.
Zhang et al., "Investigation of signal-to-noise ratio in frequency-domain multiphoton fluorescence lifetime imaging microscopy," J. Opt. Soc. Am. A, Jul. 2016, 33(7): B1-B11.
Zhang et al., "Saturation-compensated measurements for fluorescence lifetime imaging microscopy," Opt. Lett, Jan. 2017, 42(1): 155-158.
Zhang et al., "Super-resolution fluorescence microscopy by stepwise optical saturation," Biomed. Opt. Express, Apr. 2018, 9(4):1631-1629.

(56) References Cited

OTHER PUBLICATIONS

Zhang et al., "Super-sensitivity multiphoton frequency-domain fluorescence lifetime imaging microscopy," Opt. Express, Sep. 2016, 24(18): 20862-20867.
Zhao et al., "Resolution enhancement of saturated fluorescence emission difference microscopy," Opt. Express, Oct. 2016, 24(20): 23596-23609.
Zhao et al., "Saturated absorption competition microscopy," Optics, Jun. 2017, 4(6): 633-636.
Zipfel et al., "Nonlinear magic: multiphoton microscopy in the biosciences," Nat. Biotechnol., Nov. 2003, 21(11): 1369-1377.
Zucker, "Quality assessment of confocal microscopy slide based systems: Performance," Cytometry Part A, Jun. 2006, 69A: 659-676.
International Search Report and Written Opinion for Application No. PCT/US2018/067905 dated Mar. 26, 2019 (9 pages).

* cited by examiner

SUPER-RESOLUTION FLUORESCENCE MICROSCOPY BY STEPWISE OPTICAL SATURATION

CROSS-REFERENCE TO RELATED APPLICATION(S)

This application is a U.S. national stage entry of International Patent Application No. PCT/US2018/067905, filed on Dec. 28, 2018, which claims priority to U.S. Provisional Patent Application No. 62/722,606, filed on Aug. 24, 2018, and U.S. Provisional Patent Application No. 62/611,447, filed on Dec. 28, 2017, the entire contents of each of which are fully incorporated herein by reference.

STATEMENT REGARDING FEDERALLY SPONSORED RESEARCH

This invention was made with government support under award number CBET1554516 awarded by the National Science Foundation. The government has certain rights in the invention.

BACKGROUND

1. Field of the Disclosure

The present disclosure relates generally to microscopy. More specifically, the present disclosure is directed to systems, methods, and devices for resolving features with a resolution higher than the diffraction limit.

2. Description of Related Art

Optical systems such as microscopes are theoretically limited in the resolution which may be obtained therefrom. This limit is referred to as the "diffraction limit" of an image. By performing particular processing on images obtained from diffraction-limited systems, it is possible to generate images which appear to have a resolution higher than the diffraction limit. Such images are referred to as "super-resolution images."

Existing super-resolution microscopy techniques are subject to drawbacks. For example, some techniques only work on thin and nearly transparent samples. Furthermore, some techniques require expensive and complicated implementations, and/or large excitation powers.

Accordingly, there exists a need for systems, methods, and devices capable of super-resolution microscopy which provide greater flexibility in the type of samples capable of being imaged, which may be implemented in a simple and inexpensive manner, and which utilize comparatively low excitation powers.

BRIEF SUMMARY OF THE DISCLOSURE

Various aspects of the present disclosure relate to circuits, systems, and methods for super-resolution microscopy.

In one exemplary aspect of the present disclosure, there is provided a method of generating an output microscopy image, comprising: obtaining a plurality of raw fluorescence images, respective ones of the plurality of raw fluorescence images obtained by exciting a sample using a light source at a respective irradiance value in a weak saturation region of the sample, and capturing the respective raw fluorescence image; applying a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained; and linearly combining the plurality of weighted fluorescence images, thereby generating the output image having a resolution greater than a diffraction limit, wherein respective raw fluorescence images correspond to irradiance values different from one another.

In another exemplary aspect of the present disclosure, there is provided a non-transitory computer-readable medium storing instructions that, when executed by a processor, cause the processor to perform operations comprising: obtaining a plurality of raw fluorescence images, respective ones of the plurality of raw fluorescence images obtained by exciting a sample using a light source at a respective irradiance value in a weak saturation region of the sample, and capturing the respective raw fluorescence image; applying a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained; and linearly combining the plurality of weighted fluorescence images, thereby generating the output image having a resolution greater than a diffraction limit, wherein respective raw fluorescence images correspond to irradiance values different from one another.

In another exemplary aspect of the present disclosure, there is provided a microscopy system, comprising: a light source configured to excite a sample; an imaging device configured to obtain a plurality of raw fluorescence images, respective ones of the plurality of raw fluorescence images obtained by exciting the sample using the light source at a respective irradiance value in a weak saturation region of the sample, and capturing the respective raw fluorescence image; and a controller configured to: apply a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained, and linearly combine the plurality of weighted fluorescence images, thereby generating the output image having a resolution greater than a diffraction limit, wherein respective raw fluorescence images correspond to irradiance values different from one another.

In this manner, various aspects of the present disclosure provide for improvements in at least the technical fields of fluorescence microscopy.

This disclosure can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as circuit configurations, waveform timings, circuit operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in microscopy, it will be understood that this is merely one example of an implementation. It will further be understood that the disclosed systems, methods, and devices can be used in any device in which there is a need to produce an image with a resolution exceeding the diffraction limit; for example, imaging, image processing, and so on.

A super-resolution image is one in which the resolution, measured by the full-width half-maximum (FWHM) of the point spread function (PSF), is narrower than the diffraction limit. In order to overcome the above-described difficulties in super-resolution microscopy, a technique called Stepwise Optical Saturation (SOS) is described, which includes Generalized Stepwise Optical Saturation (GSOS) and Deconvolution Stepwise Optical Saturation (DeSOS). SOS, GSOS, and DeSOS are designed to work with both confocal and multiphoton microscopy (MPM) modalities and to permit deep penetration into a sample.

Stepwise Optical Saturation

Figure 1:
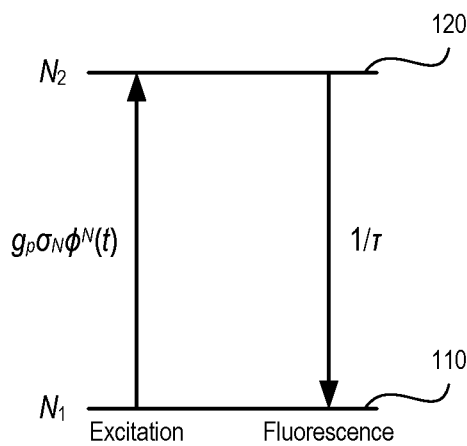
FIG. 1 illustrates an exemplary two-level fluorophore model for use with various aspects of the present disclosure.

The principle of SOS microscopy is based on a two-level fluorophore model illustrated in FIG. 1. As illustrated in FIG. 1, fluorophores transition between a ground state 110 and an excited singlet state 120 at particular rates. The population of the ground state 110 is denoted as $N_1(t)$ and the population of the excited singlet state 120 is $N_2(t)$, respectively. The total concentration of the fluorophore is denoted as $N_0 = N_1(t) + N_2(t)$ and is invariant in time. The excitation rate, which is the rate at which the fluorophores transition from the ground state 110 to the excited singlet state 120, is represented as $g_p \sigma_N \phi^N(t)$, where $g_p$ is the pulse gain factor, which accounts for the temporal pulse profile of the excitation; N is the number of excitation photons needed for a fluorophore to emit one photon, and is one for one-photon excitation fluorescence (1PEF) and two for two-photon excitation fluorescence (2PEF); $\sigma_N$ is the cross-section for N-photon excitation; and $\phi(t)$ is the incident photon flux for N-photon excitation. The fluorescence rate, which is the rate at which the fluorophores transition from the excited singlet state 120 to the ground state 110, is represented as $1/\tau$, where $\tau$ is the fluorescence lifetime. The rate equation corresponding to the fluorophore model of FIG. 1 is given by the following expression (1):

$$\frac{dN_2(t)}{dt} = g_P \sigma_N \phi^N(t)(N_0 - N_2(t)) - \frac{N_2(t)}{\tau} \quad (1)$$

The experimentally measurable excitation irradiance, I(t), and fluorescence intensity, F(t), may be determined using the following expression (2) and (3):

$$I(t) = \frac{\phi(t)hc}{\lambda} \quad (2)$$

$$F(t) = \frac{N_2(t)\psi_F t_{ob}}{\tau} \quad (3)$$

In expressions (2) and (3) above, h is Planck's constant, c is the speed of light, $\lambda$ is the excitation wavelength, $\psi_F$ is the fluorescence detection efficiency, and $t_{ob}$ is the observation time. Expressions (1)-(3) may be combined to produce the following expression (4):

$$\frac{dF(t)}{dt} = KN_0 g_P \sigma_N \gamma^N I^N(t) - \left(g_P \sigma_N \gamma^N I^N(t) + \frac{1}{\tau}\right)F(t) \quad (4)$$

In expression (4) above, $\gamma = \lambda/hc$ and $K = \psi_F t_{ob}/\tau$. The SOS technique is based on the linear combination of fluorescence intensity images, and it is thus valid to solely consider steady-state solutions of the fluorophore model. Dropping the time dependence of expression (4), the following expression (5) may be obtained:

$$F = \frac{KN_0(\tau g_P \sigma_N \gamma^N I^N)}{1 + \tau g_P \sigma_N \gamma^N I^N} \quad (5)$$

Figure 2:
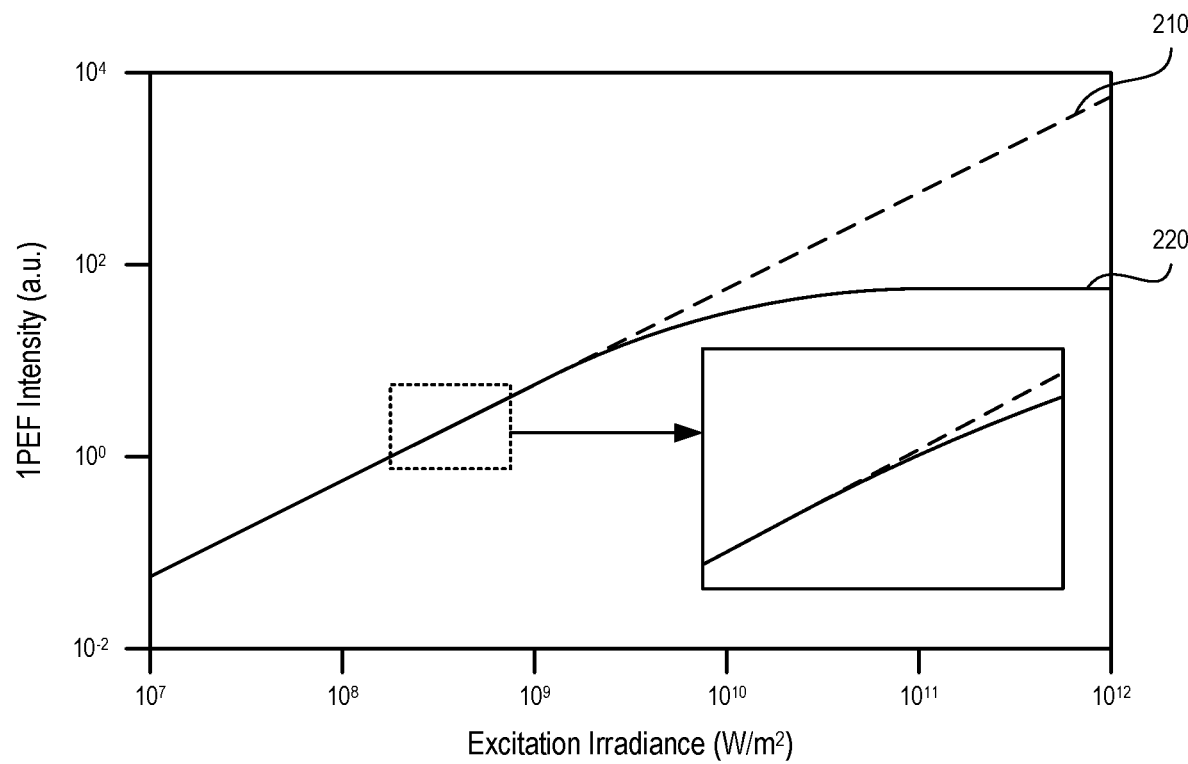
FIG. 2 illustrates an exemplary fluorescence-excitation relationship for the exemplary fluorophore model of FIG. 1.

The fluorophore model illustrated in FIG. 1 may precisely describe the fluorophore saturation behavior, even though higher excited singlet and triplet states and photobleaching are not considered. FIG. 2 illustrates the simulated fluorescence-excitation relationship for the fluorophore model of FIG. 1, in the 1PEF case. In FIG. 2, the horizontal axis illustrates the excitation irradiance (in $W/m^2$) on a log scale and the vertical axis illustrates the intensity (in arbitrary units). In the range of low excitation irradiance, the fluorescence-excitation relation is linear and unsaturated, as illustrated by a theoretical unsaturated curve 210 and a saturated curve 220. In the range of high excitation irradiance, the fluorescence-excitation relation is non-linear and saturated, as illustrated by the divergence between the curves 210 and 220. The saturation phenomenon may happen even without a high excitation irradiance. Specifically, as illustrated by the inset to FIG. 2, the saturated curve 220 may deviate from the theoretical unsaturated curve 210 even for moderate excitation irradiances. This phenomenon is referred to as "weak saturation" in the present disclosure. Because of the weak saturation phenomenon, SOS microscopy is able to produce super-resolution images even at a relatively low excitation intensity.

Under the weak saturation condition, expression (5) above may be Taylor-expanded to the following expression (6):

$$F = KN_0 \sum_{n=0}^{N} (-1)^{n+1} \tau^n g_p^n \sigma_N^n \gamma^{nN} I^{nN} \quad (6)$$

Expression (6) may be simplified and rewritten using the substation $a = \tau g_p \sigma_N \gamma^N$, which results in the following expression (7):

$$F = KN_0(aI^N - a^2 I^{2N} + a^3 I^{3N} - \ldots) \quad (7)$$

An M-step SOS microscopy denotes that M fluorescence images are to be collected. To illustrate M-step SOS microscopy, the one-dimensional spatial dependence of excitation and fluorescence is described here, which may be extended to a multi-dimensional case. In one dimension, it is assumed that the irradiation excitation profile I(x) is Gaussian, such that $I(x) = I_0 \exp(-2x^2/\omega_0^2)$ where $I_0$ represents the focal irradiance and $\omega_0$ represents the $1/e^2$ radius. In the case of N-photon excitation, this profile may be represented as raised to the $N^{th}$ power. Using this relationship, expression (7) above may be rewritten as the following expression (8):

$$F = KN_0(aI_{0i}^N g^N(x) - a^2 I_{0i}^{2N} g^{2N}(x) + a^3 I_{0i}^{3N} g^{3N}(x) - \ldots) \quad (8)$$

Above, the subscript i represents the $i^{th}$ step image among the M images. In expression (8), the $g^N(x)$ term represents the diffraction-limited component, whereas higher powers of $g^N(x)$ represent components with higher spatial frequency. Based on this use of $g^N(x)$, the $M^{th}$ order power component $g^{MN}(x)$ has a $\sqrt{M}$-fold increase in spatial resolution. Due to the magnitude difference among components, the spatial resolution of $F_i(x)$ is dominated by the lowest power of $g^N(x)$. M-step microscopy eliminates the lowest M−1 powers of $g^N(x)$ by the linear combination of M steps of images obtained at different excitation intensities. The excitation intensities of each step may be selected such that they follow the relationship $I_{01} < I_{02} < \ldots < I_{0M}$ and such that they are each in the weak saturation region. The resulting SOS image may be represented by the following expression (9):

$$F_{M-SOS}(x) = \sum_{i=1}^{M} c_i F_i(x) \quad (9)$$

Above, the coefficients $c_i$ are based on the excitation intensities of various steps and are chosen such that the lowest power of $g^N(x)$ in $F_{M-SOS}(x)$ is $g^{MN}(x)$. An example of the coefficients $c_i$ for two-step through four-step microscopy is provided in Table 1 below.

TABLE 1

| Coefficients | | Expressions |
|---|---|---|
| Two-step | c1 | 1 |
| | c2 | $-\dfrac{I_{01}^N}{I_{02}^N}$ |
| Three-step | c1 | 1 |
| | c2 | $-\dfrac{I_{01}^N(I_{01}^N - I_{03}^N)}{I_{02}^N(I_{02}^N - I_{03}^N)}$ |
| | c3 | $\dfrac{I_{01}^N(I_{01}^N - I_{02}^N)}{I_{03}^N(I_{02}^N - I_{03}^N)}$ |
| Four-step | c1 | 1 |
| | c2 | $-\dfrac{I_{01}^N(I_{01}^N - I_{03}^N)(I_{01}^N - I_{04}^N)}{I_{02}^N(I_{02}^N - I_{03}^N)(I_{02}^N - I_{04}^N)}$ |
| | c3 | $\dfrac{I_{01}^N(I_{01}^N - I_{02}^N)(I_{01}^N - I_{04}^N)}{I_{03}^N(I_{02}^N - I_{03}^N)(I_{03}^N - I_{04}^N)}$ |
| | c4 | $-\dfrac{I_{01}^N(I_{01}^N - I_{02}^N)(I_{01}^N - I_{03}^N)}{I_{04}^N(I_{02}^N - I_{04}^N)(I_{03}^N - I_{04}^N)}$ |

While Table 1 only lists coefficients for two-step through four-step microscopy, the coefficients for any number of steps can be calculated accordingly. More generally, the coefficients of the linear combination, $c_1, c_2, \ldots, c_M$, of the images with excitation intensities, $I_{01}, I_{02}, \ldots, I_{0M}$, are calculated by solving M variables from M−1 equations, where the M variables are the coefficients and the M−1 equations are the constraints that the lowest M−1 powers of $g^N(x)$ in the resulting image are eliminated. Because this is an under-constrained problem, $c_1$ may be set to 1 without loss of generality.

From the above, a rule about the formation of SOS coefficients can be observed. Specifically, for two adjacent steps A and B, where B=A+1, if i<B, the coefficient $c_i$ in B-step SOS is the product of $c_i$ in A-step SOS and a factor $(I_{0i}^N - I_{0B}^N)/(I_{0i}^N - I_{0B}^N)$; if i=B, hen $c_i$ in B-step SOS is given by the following expression (10):

$$c_B = (-1)^{B-1} \left(\dfrac{I_{01}^N}{I_{0B}^N}\right) \prod_{j=2}^{B-1} \dfrac{I_{01}^N - I_{0j}^N}{I_{0j}^N - I_{0B}^N} \quad (10)$$

According to expression (9) and the coefficients of expression (10) and/or Table 1, an M-step SOS image will have a $\sqrt{M}$-fold increase in spatial resolution.

Depending on the number of steps M and the particular irradiance excitation values chosen for each step, the signal-to-noise ratio (SNR) of the resulting SOS image, given by expression (9) above, may vary. For example, in two-step SOS where the value of $I_{01}$ is close to the value of $I_{02}$, expression (9) shows that $F_{2-SOS} \approx 0$. In such a case, the expected intensity and consequently the SNR of the resulting SOS image may be weak. Generally, for an M-step SOS image at a pixel $x = x_0$, and denoting the experimentally obtained values of $F_i$ and $F_{M-SOS}$ as random variables $X_i$ and $Y_{M-SOS}$, respectively, the mean of $X_i$ is given by the following expression (11):

$$\mu_i = E[X_i] = \delta(x - x_0) \times F_i(x) = F_i(x_0) \quad (11)$$

Expression (11) may be calculated using expression (5). Due to the high detection efficiency of photomultiplier tubes (PMTs) in confocal and two-photon microscopes, it is valid to consider shot noise as the only noise source in modeling the system. Therefore, the variance of $X_i$, which equals $\mu_i$, is given by the following expression (12):

$$\sigma_i^2 = \mathrm{var}(X_i) = \mu_i \quad (12)$$

Because the $X_i$ are mutually independent, expressions (11) and (12) become the following expressions (13) and (14), respectively:

$$\mu_{M-SOS} = E\left[\sum_{i=1}^{M} c_i X_i\right] = \sum_{i=1}^{M} c_i \mu_i \quad (13)$$

$$\sigma^2_{M-SOS} = \mathrm{var}\left(\sum_{i=1}^{M} c_i X_i\right) = \sum_{i=1}^{M} c_i^2 \sigma_i^2 = \sum_{i=1}^{M} c_i^2 \mu_i \quad (14)$$

Consequently, the SNR of measuring $Y_{M-SOS}$ is given by the following expression (15):

$$SNR_{M-SOS} = \frac{\mu_{M-SOS}}{\sigma_{M-SOS}} = \frac{\sum_{i=1}^{M} c_i \mu_i}{\sqrt{\sum_{i=1}^{M} c_i^2 \mu_i}} \quad (15)$$

The excitation intensity I will affect the SNR and FWHM differently. To achieve super-resolution images, an FWHM goal should be selected below the diffraction limit (e.g., ~170 nm). For two-step SOS, the ratio $I_1/I_0$ is preferably between 1.04 and 1.53 depending on several factors, including whether 1PEF or 2PEF modalities are used. If the ratio is too low, it may be difficult to produce satisfactory two-step SOS images. If the ratio is too high, practical problems such as detector saturation due to limited dynamic range, photobleaching, and photodamage may occur. Most preferably, the ratio $I_1/I_0$ is approximately 1.2.

Figure 3:
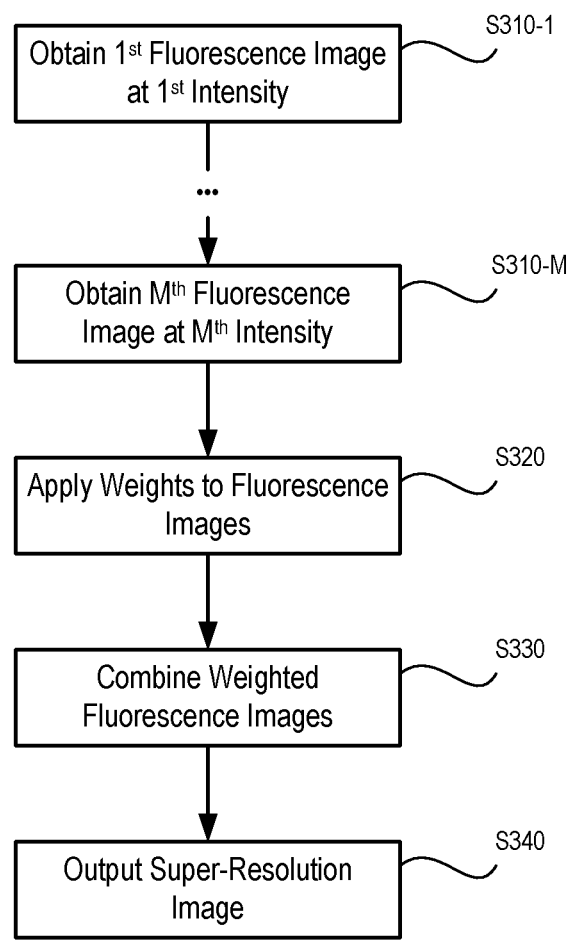
FIG. 3 illustrates an exemplary process flow for super-resolution microscopy according to various aspects of the present disclosure.

FIG. 3 illustrates an exemplary process flow for implementing the principle of M-step SOS. The exemplary process flow begins with step S310-1, in which a first raw fluorescence image is obtained. The first raw fluorescence image may be obtained by exciting a sample using a light source, such as a laser, at a first irradiance value (intensity) which lies in the weak saturation region of the microscope, and then capturing an image representing the fluorescence of the sample. This process is repeated M times, each at a different irradiance value, until at step S310-M in which an $M^{th}$ raw fluorescence image is obtained. Once M raw fluorescence images have been obtained, at step S320 M weights are applied to the M raw fluorescence images in a 1-to-1 correspondence. The respective weights are preferably the coefficients $c_i$ of Table 1 and/or expression (10) above, and are based on the irradiance values at which the raw fluorescence images were obtained. Once the weights have been applied, thereby to generate M weighted fluorescence images, at step S330 the weighted fluorescence images are linearly combined. The linear combination of the M weighted fluorescence images may be performed according to expression (9) above, thereby to generate an output image having a resolution greater than the diffraction limit.

Figure 4:
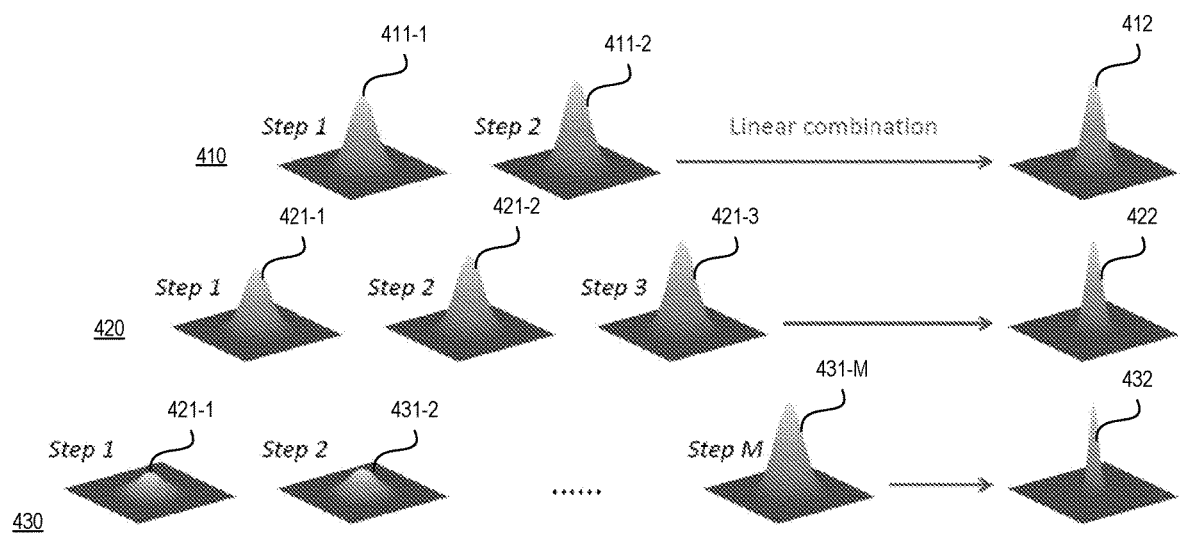
FIG. 4 illustrates a series of exemplary processes according to various aspects of the present disclosure.

This process is illustrated conceptually by FIG. 4. Specifically, FIG. 4 illustrates an exemplary two-step process 410, an exemplary three-step process 420, and an exemplary M-step process 430. In the two-step process 410 of FIG. 4, images 411-1 and 411-2 represent the PSFs for the first and second raw fluorescence images, respectively. The image 411-2 is obtained at a higher irradiance value than the image 411-1. The images 411-1 and 411-2 are then linearly combined to obtain an output image 412. As illustrated in FIG. 4, the PSF of the output image 412 is narrower than the PSFs of the images 411-1 and 411-2; as such, the output image 412 has an improved resolution compared to the images 411-1 and 411-2. Analogously, the three-step process 420 obtains images 421-1 through 421-3 to generate an output image 422 having a narrower PSF, and the M-step process 430 obtains images 431-1 through 431-M to generate an output image 432 having a narrower PSF. In each process, the coefficients for the linear combination are given by Table 1 and expression (10), and result in a √M-fold increase in spatial resolution compared to the diffraction-limited case.

Figure 5A:
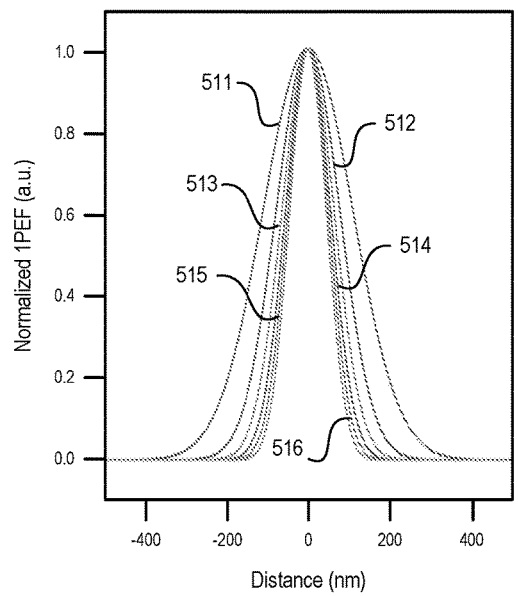
FIG. 5A and FIG. 5B illustrate a comparison among various exemplary output images according to various aspects of the present disclosure.
Figure 5B:
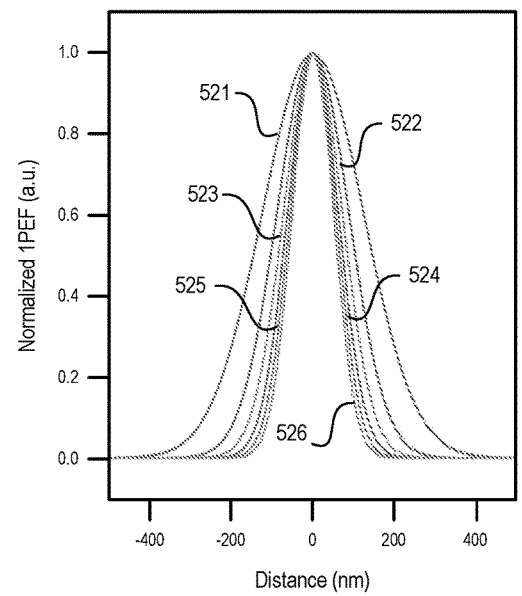

FIGS. 5A-B illustrate a comparison among exemplary M-step SOS output images for various values of M for 1PEF and 2PEF modalities, respectively. Specifically, FIGS. 5A-B illustrate numerical simulations of the PSF of the output image, in arbitrary units normalized to a peak of 1, as a function of the distance along one dimension, in nanometers. In FIG. 5A, curve 511 represents the diffraction-limited case (FWHM 228.9 nm), curve 512 represents two-step 1PEF SOS microscopy (FWHM 162.1 nm), curve 513 represents three-step 1PEF SOS microscopy (FWHM 132.5 nm), curve 514 represents four-step 1PEF SOS microscopy (FWHM 114.9 nm), curve 515 represents five-step 1PEF SOS microscopy (FWHM 103.1 nm), and curve 515 represents six-step 1PEF SOS microscopy (FWHM 94.5 nm). In FIG. 5B, curve 521 represents the diffraction-limited case (FWHM 265.3 nm), curve 522 represents two-step 2PEF SOS microscopy (FWHM 187.7 nm), curve 523 represents three-step 2PEF SOS microscopy (FWHM 153.5 nm), curve 524 represents four-step 2PEF SOS microscopy (FWHM 133.3 nm), curve 525 represents five-step 2PEF SOS microscopy (FWHM 119.5 nm), and curve 525 represents six-step 2PEF SOS microscopy (FWHM 109.5 nm). The above numerical values are merely exemplary and provided to illustrate the resolution increase by multiple steps of SOS microscopy. While FIGS. 5A-B illustrate one-dimensional objects, the concept may be extended to two- or multi-dimensional cases.

Figure 6A:
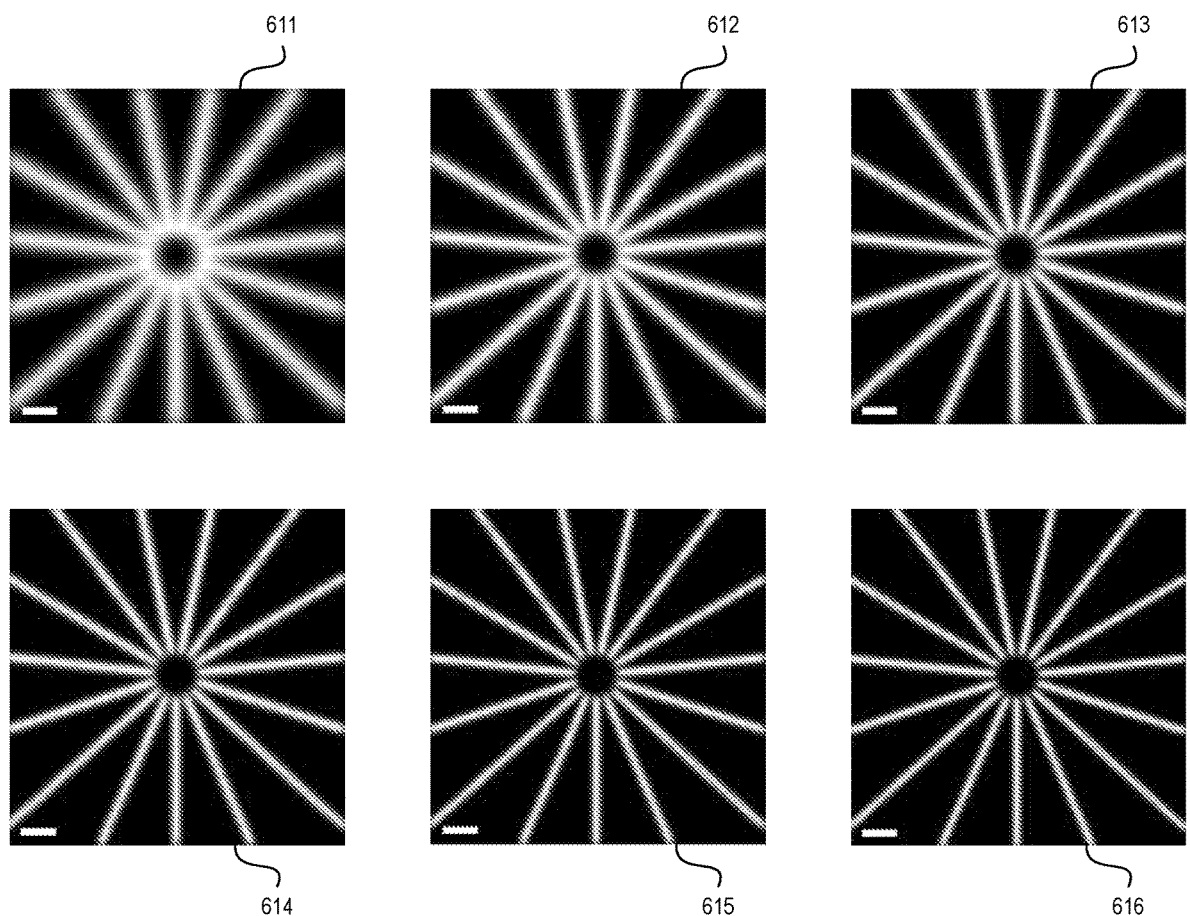
FIG. 6A and FIG. 6B illustrate exemplary simulated images according to various aspects of the present disclosure.
Figure 6B:
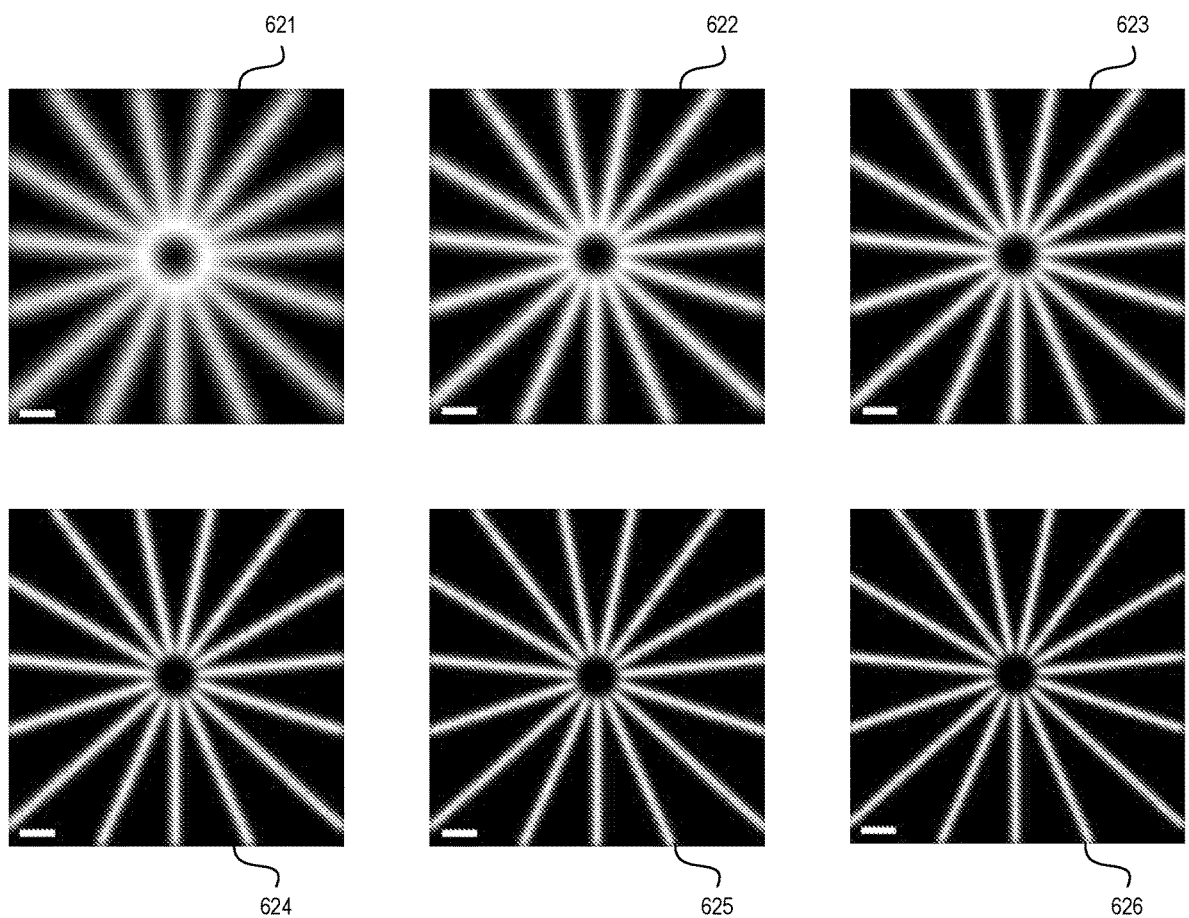

For example, FIGS. 6A-B illustrate simulated SOS images of a two-dimensional artificial object for 1PEF and 2PEF modalities, respectively. The images were generated by applying SOS to a two-dimensional simulation target having a star-like shape consisting of several lines, where the closest distance of the lines is 140 nm. The PSFs illustrated in FIGS. 5A-B were used as kernels to simulate the diffraction-limited and SOS images for both 1PEF (FIG. 6A) and 2PEF (FIG. 6B) cases. FIG. 6A illustrates several output images: image 611 for the diffraction-limited 1PEF case, image 612 for two-step 1PEF microscopy, image 613 for three-step 1PEF microscopy, image 614 for four-step 1PEF microscopy, image 615 for five-step 1PEF microscopy, and image 616 for six-step 1PEF microscopy. FIG. 6B illustrates image 621 for the diffraction-limited 2PEF case, image 622 for two-step 2PEF microscopy, image 623 for three-step 2PEF microscopy, image 624 for four-step 2PEF microscopy, image 625 for five-step 2PEF microscopy, and image 626 for six-step 2PEF microscopy.

The diffraction-limited images 611 and 621 are blurred and the center ends of the lines cannot be differentiated. Using SOS microscopy, super-resolved images of the object (612-616, 622-626) are obtained. Even for two-step SOS, a significant resolution improvement can be seen for both 1PEF and 2PEF. As the number of steps increases, the resolution improvement is more significant.

Figure 7:
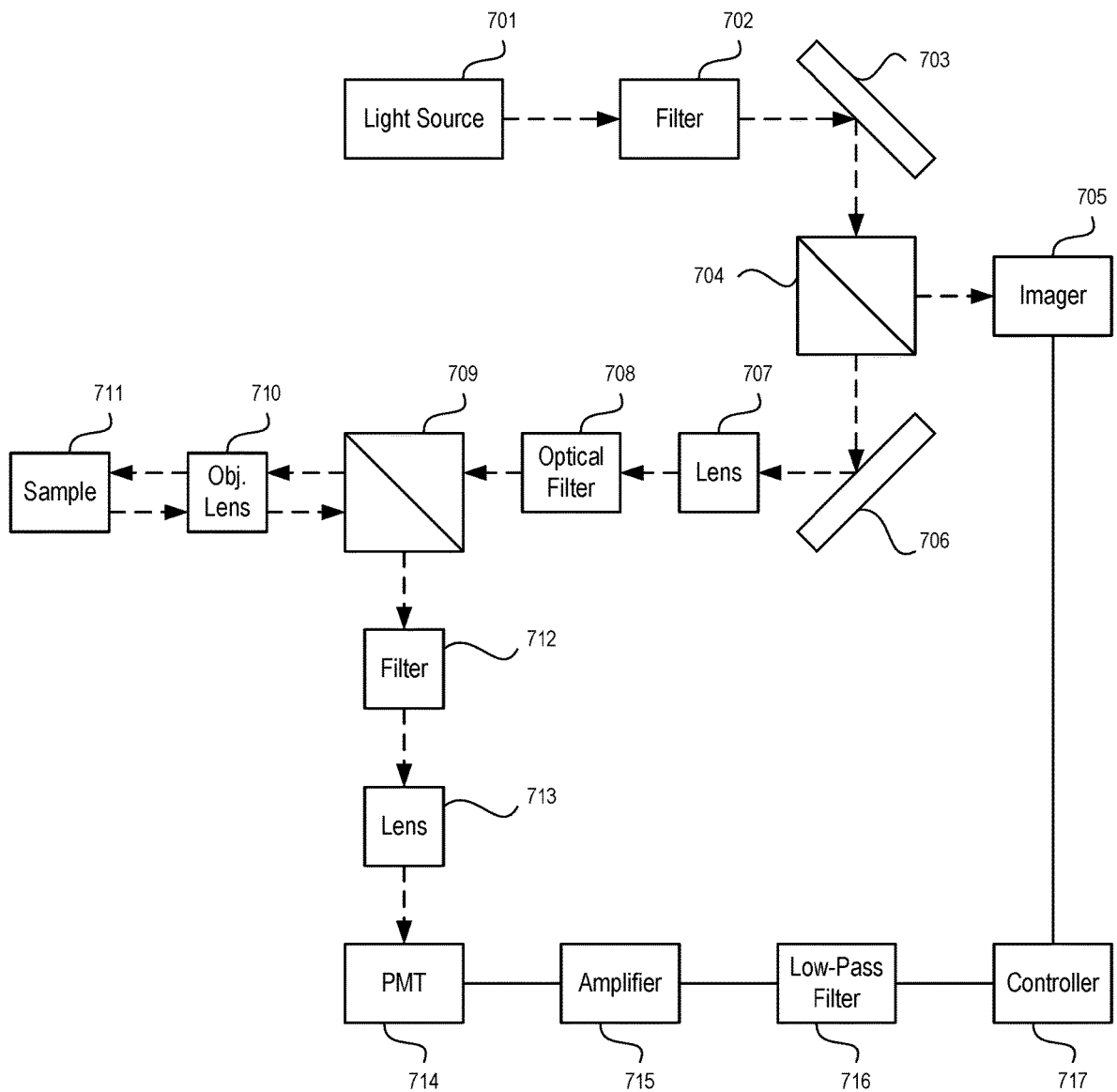
FIG. 7 illustrates an exemplary system for generating output images according to various aspects of the present disclosure.

FIG. 7 illustrates an exemplary system for generating SOS output images. In some aspects of the present disclosure, the system is a microscope. In FIG. 7, dashed lines between elements represent optical paths and solid lines between elements represent operative connections such as physical, electric, and electromagnetic connections (such as via cables or wireless protocols). As illustrated in FIG. 7, a light source 701 emits light to a filter 702, such as a long-pass filter to block ambient light. A mirror 703 reflects the light to a beam splitter 704, such as a glass slide, which sends a first portion of the light to an imager 705 (which generates an emission signal) and a second portion of the light to a mirror 706, such as a scan mirror. The light then passes through a lens 707, and an optical filter 708, which may expand the beam of light to overfill the back aperture of an objective lens 709, which creates a diffraction-limited spot on the sample 711. The sample fluoresces, sending light through the objective lens 710 to be reflected by a dichroic mirror 709 and then filtered through a filter 712 to eliminate residual excitation. The light then passes through a lens 713 and is collected by a PMT 714 to generate an excitation signal. In some exemplary aspects of the present disclosure, the system may include more or fewer optical components such as filters and lenses in order to impart particularly-desired beam shaping or characteristics. The light source 701 is preferably a laser light source, such as a mode-locked Ti:sapphire laser.

The excitation signal is amplified by an amplifier 715 and filtered by a low-pass filter 716. Both the amplified and filtered excitation signal and the emission signal are received by a controller 717, such as a computer or a processor of a microscope. The emission signal corresponds to the excitation intensity I(t) above, and the excitation signal corresponds to the fluorescence intensity F(t) above. The controller 717 may include a memory to store the emission and excitation signals, as well as any calculation results; input and output terminals, such as a data acquisition (DAQ) card; one or more processors; communication circuitry; user interfaces or I/O devices; and the like. The controller 717 may be configured to perform various calculations, including the calculation of super-resolution output images based on a number of raw fluorescence images. The calculations may be performed by hardware components of the controller 717, software modules of the controller 717, or a combination of hardware and software. In some aspects of the present disclosure, the controller 717 may send data to a remote computing device such as a server which performs the calculations.

Deconvolution Stepwise Optical Saturation

Under some circumstances, the SNR of a two-step SOS technique may become low, thus affecting the applicability of the SOS approach in, for example, intravital imaging of deep tissue in animals. To alleviate SNR issues, it is possible to use deconvolution algorithms to increase the SNR of raw images before the SOS approach is applied. The deconvolution step forms the basis of DeSOS. DeSOS is preferably implemented using blind deconvolution, which utilizes an iterative process to produce not only deconvolved images, but also a reconstructed estimate of the PSF capable of adapting to the heterogeneous environment in the biological sample, without prior knowledge of the PSF. Compared to other deconvolution methods which utilize theoretical or measured PSFs of the imaging system, blind deconvolution adapts to the real PSF of the microscope and the sample, which may be substantially different from theoretical or measured PSFs due to instrument and sample variations.

Poisson noise not only obscures the real structures in the resultant image but also creates non-realistic features that are smaller than the PSF. Deconvolution amplifies the features corresponding to the real structure while rejecting the noise features smaller than the PSF, thereby increasing the SNR of the raw images. Linearly combining the deconvolved images with the coefficients determined by the excitation laser powers used to obtain the raw images applies SOS to deconvoluted images, thus resulting in DeSOS. An M-step DeSOS image may be represented by a modification to expression (9), which produces the following expression (16):

$$F_{M-DeSOS}(x) = \sum_{i=1}^{M} c_i \, Decon[F_i(x)] \tag{16}$$

Above, the coefficients $c_i$ may be the same as those used in SOS, given by Table 1 and expression (10) above. Furthermore, Decon refers to the blind deconvolution function.

Figure 8:
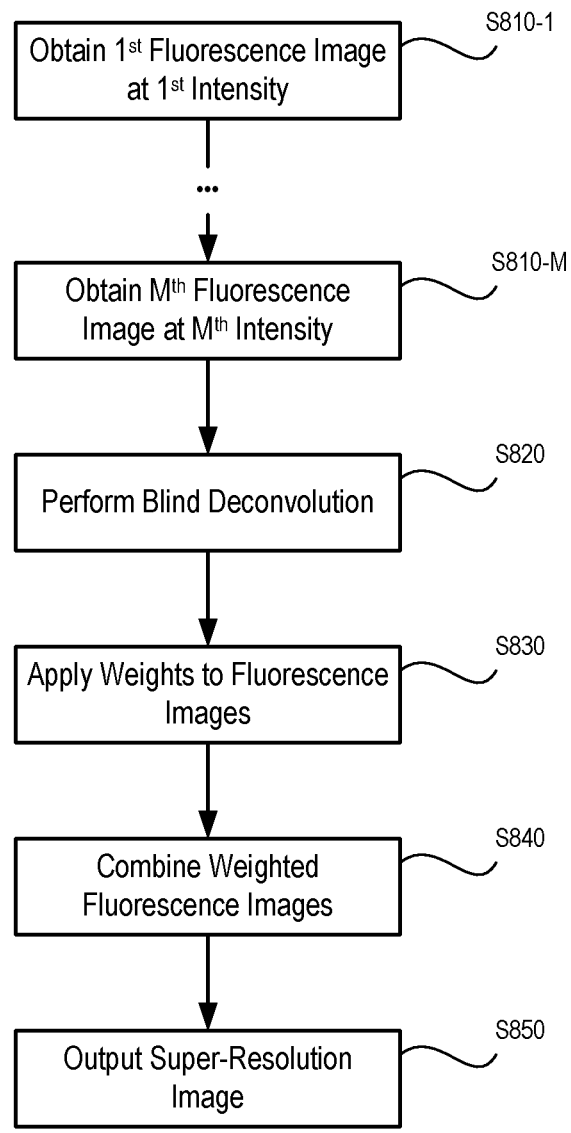
FIG. 8 illustrates another exemplary process flow for super-resolution microscopy according to various aspects of the present disclosure.

FIG. 8 illustrates an exemplary process flow for implementing the principle of M-step DeSOS. The exemplary process flow begins with step S810-1, in which a first raw fluorescence image is obtained. The first raw fluorescence image may be obtained by exciting a sample using a laser at a first irradiance value (intensity) which lies in the weak saturation region of the sample, and then capturing an image representing the fluorescence of the sample. This process is repeated M times, each at a different irradiance value, until at step S810-M in which an $M^{th}$ raw fluorescence image is obtained. Once M raw fluorescence images have been obtained, at step S820 a blind deconvolution is performed on each of the raw fluorescence images. Alternatively, a blind deconvolution may be performed on each raw fluorescence image after it has been obtained and before the raw fluorescence image for the next step has been obtained.

Subsequently, at step S830 M weights are applied to the deconvolved M raw fluorescence images in a 1-to-1 correspondence. The respective weights are preferably the coefficients $c_i$ of Table 1 and/or expression (10) above, and are based on the irradiance values at which the raw fluorescence images were obtained. Once the weights have been applied, thereby to generate M weighted fluorescence images, at step S840 the weighted fluorescence images are linearly combined. The linear combination of the M weighted deconvolved fluorescence images may be performed according to expression (16) above, thereby to generate an output image having a resolution greater than the diffraction limit.

DeSOS may be implemented using a similar (or the same) system as compared to the system illustrated in FIG. 7. In such a system, the updated operations including blind deconvolution may be performed by the controller 717, either in hardware components, software modules, or a combination of hardware and software. In some aspects of the present disclosure, the blind deconvolution may be performed by a remote computing device.

Generalized Stepwise Optical Saturation

In SOS, a steady-state (time-invariant) solution of expression (4) was used. In GSOS, however, the dynamics of the model should be considered as well. In order to solve expression (4) and utilize its dynamics, perturbation theory may be used. Perturbation theory introduces an expansion parameter E, which varies continuously between zero and one. The value $\varepsilon=1$ corresponds to the physical situation. Replacing $I^N(t)$ with $\varepsilon I^N(t)$ and expanding F(t) in powers of the interaction as $F(t)=F^{(0)}+\varepsilon F^{(1)}+\varepsilon^2 F^{(2)}+\varepsilon^3 F^{(3)}+\ldots$, the powers of $\varepsilon$ on each side of the rewritten expression (4) may be equated and collected to obtain the following set of expressions (17-1) to (17-n):

$$\epsilon^0: \frac{dF^{(0)}(t)}{dt} = -\left(\frac{1}{\tau}\right)F^{(0)}(t) \tag{17-1}$$

$$\epsilon^1: \frac{dF^{(1)}(t)}{dt} = KN_0 g_p \sigma_N \gamma^N I^N(t) - g_p \sigma_N \gamma^N I^N(t)F^{(0)}(t) - \left(\frac{1}{\tau}\right)F^{(1)}(t) \tag{17-2}$$

$$\epsilon^2: \frac{dF^{(2)}(t)}{dt} = -g_p \sigma_N \gamma^N I^N(t)F^{(1)}(t) - \left(\frac{1}{\tau}\right)F^{(2)}(t) \tag{17-3}$$

$$\epsilon^3: \frac{dF^{(3)}(t)}{dt} = -g_p \sigma_N \gamma^N I^N(t)F^{(2)}(t) - \left(\frac{1}{\tau}\right)F^{(3)}(t) \tag{17-4}$$

(...)

$$\epsilon^n: \frac{dF^{(n)}(t)}{dt} = -g_p \sigma_N \gamma^N I^N(t)F^{(n-1)}(t) - \left(\frac{1}{\tau}\right)F^{(n)}(t) \tag{17-n}$$

In GSOS microscopy, the excitation irradiance I(t) is modulated by a periodic signal. The modulation may be implemented by physical instruments such as a mechanical chopper, an electro-optic modulator (EOM), or an acousto-optic modulator (AOM). Alternatively, the modulated excitation can also be the inherent femtosecond pulses in a mode-locked laser. As can be seen from expression (4), both $I^N(t)$ and F(t) are also periodic and possess the same angular frequency $\omega_0$ and period T compared with I(t). Based on the periodicity of $I^N(t)$, it may be rewritten with a Fourier series as shown in the following expression (18):

$$I^N(t) = \bar{I}^N \sum_{k=-\infty}^{\infty} p_k e^{ik\omega_0 t}, \; p_k = \frac{1}{T}\int_{-\infty}^{\infty} \frac{I^N(t)}{\bar{I}^N} e^{-ik\omega_0 t} dt \tag{18}$$

Above, $\bar{I}^N$ is used to normalize the excitation power such that $p_0=1$; therefore, it is given by the following expression (19):

$$= \bar{I}^N = \frac{1}{T}\int_{-\infty}^{\infty} I^N(t) dt \tag{19}$$

Similarly, F(t) may be rewritten with a Fourier series as shown in the following expression (20):

$$F(t) = \sum_{k=-\infty}^{\infty} q_k e^{ik\omega_0 t}, \; q_k = \frac{1}{T}\int_{-\infty}^{\infty} F(t) e^{-ik\omega_0 t} dt \tag{20}$$

In view of the perturbation expansion of F(t) above, the Fourier coefficients $q_k$ may also be written according to the following expression (21):

$$q_k = q_k^{(0)} + \epsilon q_k^{(1)} + \epsilon^2 q_k^{(2)} + \epsilon^3 q_k^{(3)} + \ldots \tag{21}$$

Therefore, for each order of interaction, $F^{(n)}(t)$ is given by the following expression (22):

$$F^{(n)}(t) = \sum_{k=-\infty}^{\infty} q_k^{(n)} e^{ik\omega_0 t}, \; q_k^{(n)} = \frac{1}{T}\int_{-\infty}^{\infty} F^{(n)}(t) e^{-ik\omega_0 t} dt \tag{22}$$

In expressions (18), (21), and (22), the Fourier coefficients $p_k$, $q_k$, and $q_k^{(n)}$ are complex numbers. In view of these expressions, expressions (17-1) to (17-n) may be analyzed to determine the interaction orders.

The zero-order interaction (n=0) is given by expression (17-1). Because no excitation is added before t=0, $F^{(0)}(0)=0$. Therefore $F^{(0)}(t)=0$ for all $t\geq 0$, and correspondingly $q_k^{(0)}=0$. The first-order interaction (n=1) through the $n^{th}$-order interaction ($n\geq 2$), given by expressions (17-2) to (17-n), produce the following expressions (23-1) to (23-n):

$$q_k^{(1)} = KN_0 a \bar{I}^N \left(\frac{1}{1+ik\omega_0 \tau} p_k\right) \tag{23-1}$$

$$q_k^{(2)} = -KN_0 a^2 \bar{I}^{2N}\left(\frac{1}{1+ik\omega_0 \tau}\left[p_k * \left(\frac{1}{1+ik\omega_0 \tau} p_k\right)\right]\right) \tag{23-2}$$

$$q_k^{(3)} = KN_0 a^3 \bar{I}^{3N}\left(\frac{1}{1+ik\omega_0 \tau}\left[p_k * \left(\frac{1}{1+ik\omega_0 \tau}\left[p_k * \left(\frac{1}{1+ik\omega_0 \tau} p_k\right)\right]\right)\right]\right) \tag{23-3}$$

(...)

$$q_k^{(n)} = (-1)^{n+1} KN_0 a^n \bar{I}^{nN}\left(\frac{1}{1+ik\omega_0 \tau}\left[p_k * \left(\frac{1}{1+ik\omega_0 \tau}[p_k * (\ldots)]\right)\right]\right) \tag{23-n}$$

In expressions (23-1) to (23-n), the substation $a=\tau g_p \sigma_N \gamma^N$ has been used for simplification, in a similar manner to expression (7) above. Furthermore, in expressions (23-2) to (23-n), the asterisk (*) denotes a discrete convolution operator. Combining expressions (23-1) to (23-n) with expression (21), in physical situations where $\varepsilon=1$, the following expression (24) is obtained:

$$q_k = q_k^{(1)} + q_k^{(2)} + q_k^{(3)} + \cdots = KN_0\Bigg\{a\bar{I}^N\left(\frac{1}{1+ik\omega_0 \tau} p_k\right) - \\ a^2 \bar{I}^{2N}\left(\frac{1}{1+ik\omega_0 \tau}\left[p_k * \left(\frac{1}{1+ik\omega_0 \tau} p_k\right)\right]\right) + a^3 \bar{I}^{3N} \\ \left(\frac{1}{1+ik\omega_0 \tau}\left[p_k * \left(\frac{1}{1+ik\omega_0 \tau}\left[p_k * \left(\frac{1}{1+ik\omega_0 \tau} p_k\right)\right]\right)\right]\right) - \cdots\Bigg\} \tag{24}$$

To illustrate M-step GSOS microscopy, the one-dimensional spatial dependence of excitation and fluorescence is described here, which may be extended to a multi-dimensional case. Similar to the SOS case, it is assumed that the irradiation excitation profile $\bar{I}(x)$ is Gaussian, such that $\bar{I}(x)=I_0 \exp(-2x^2/\omega_0^2)$ where $I_0$ represents the focal irradiance and $\omega_0$ represents the $1/e^2$ radius. In the case of N-photon excitation, this profile may be represented as raised to the $N^{th}$ power. Whereas SOS microscopy uses M fluorescence images, an M-step GSOS microscopy uses M steps of harmonic images $q_k$. A subscript m is added to expression (24) to denote the $m^{th}$ step image among the M images and the spatial dependence is isolated to produce the following expression (25):

$$q_{k,m}(x) = KN_0 \left\{ a\bar{I}^N g^N(x) \left( \frac{1}{1+ik\omega_0\tau} p_k \right) - \right. \qquad (25)$$

$$a^2 \bar{I}^{2N} g^{2N}(x) \left( \frac{1}{1+ik\omega_0\tau} \left[ p_k * \left( \frac{1}{1+ik\omega_0\tau} p_k \right) \right] \right) + a^3 \bar{I}^{3N} g^{3N}(x)$$

$$\left. \left( \frac{1}{1+ik\omega_0\tau} \left[ p_k * \left( \frac{1}{1+ik\omega_0\tau} \left[ p_k * \left( \frac{1}{1+ik\omega_0\tau} p_k \right) \right] \right) \right] \right) - \cdots \right\}$$

In expression (25), the $g^N(x)$ term represents the diffraction-limited component, whereas higher powers of $g^N(x)$ represent components with higher spatial frequency. Based on this use of $g^N(x)$, the $M^{th}$ order power component $g^{MN}(x)$ has a $\sqrt{M}$-fold increase in spatial resolution. Due to the magnitude difference among components, the spatial resolution of $F_i(x)$ is dominated by the lowest power of $g^N(x)$. M-step microscopy eliminates the lowest M−1 powers of $g^N(x)$ by the linear combination of M steps of images obtained at different excitation intensities. The excitation intensities of each step may be selected such that they follow the relationship $I_{01} < I_{02} < \ldots < I_{0M}$ and such that they are each in the weak saturation region. The resulting GSOS image may be represented by the following expression (26):

$$q_{k,M-GSOS} = \sum_{m=1}^{M} c_m q_{k,m}(x) \qquad (26)$$

Above, the coefficients $c_m$ may be equivalent to the coefficients $c_i$ used in SOS microscopy, and given by Table 1 and expression (10) above. By comparing expressions (9) and (26), it can be seen that SOS microscopy corresponds to GSOS microscopy in which $\omega_0=0$.

Figure 9:
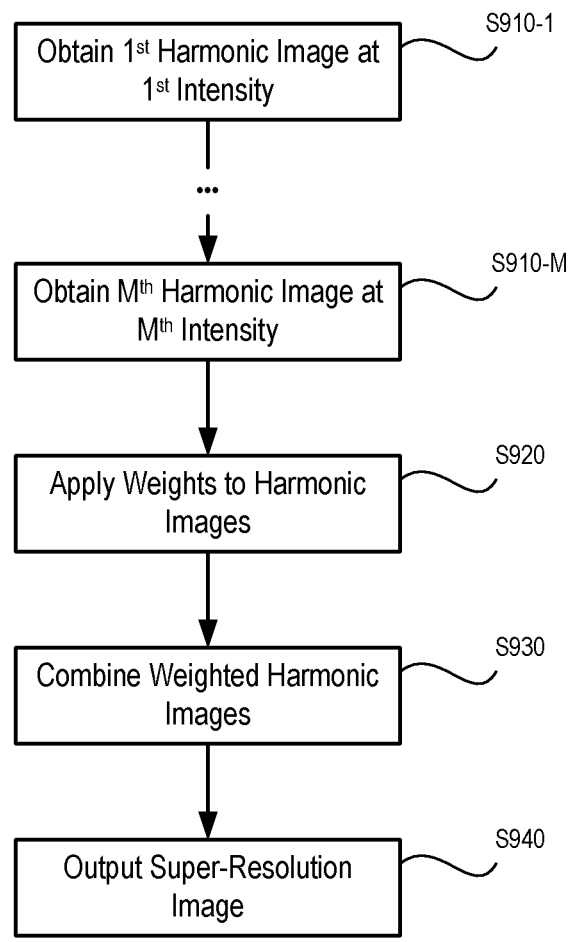
FIG. 9 illustrates another exemplary process flow for super-resolution microscopy according to various aspects of the present disclosure.

FIG. 9 illustrates an exemplary process flow for implementing the principle of M-step GSOS. The exemplary process flow begins with step S910-1, in which a first raw harmonic image is obtained. The first raw harmonic image may be obtained by exciting a sample using a laser at a first irradiance value (intensity) which lies in the weak saturation region of the sample, modulated by a periodic signal, and then capturing an image representing the fluorescence of the sample. In other words, the raw harmonic image is analogous to the "raw fluorescence image" of SOS, except that the excitation irradiance is modulated. In some aspects of the present disclosure, the term "raw fluorescence image" may refer to either an SOS image or a GSOS image. This process is repeated M times, each at a different irradiance value, until at step S310-M in which an $M^{th}$ raw harmonic image is obtained. Once M raw harmonic images have been obtained, at step S320 M weights are applied to the M raw harmonic images in a 1-to-1 correspondence. The respective weights are preferably the coefficients $c_i$ of Table 1 and/or expression (10) above, and are based on the irradiance values at which the raw harmonic images were obtained. Once the weights have been applied, thereby to generate M weighted harmonic images, at step S330 the weighted fluorescence images are linearly combined. The linear combination of the M weighted harmonic images may be performed according to expression (26) above, thereby to generate an output image having a resolution greater than the diffraction limit.

Figure 10:
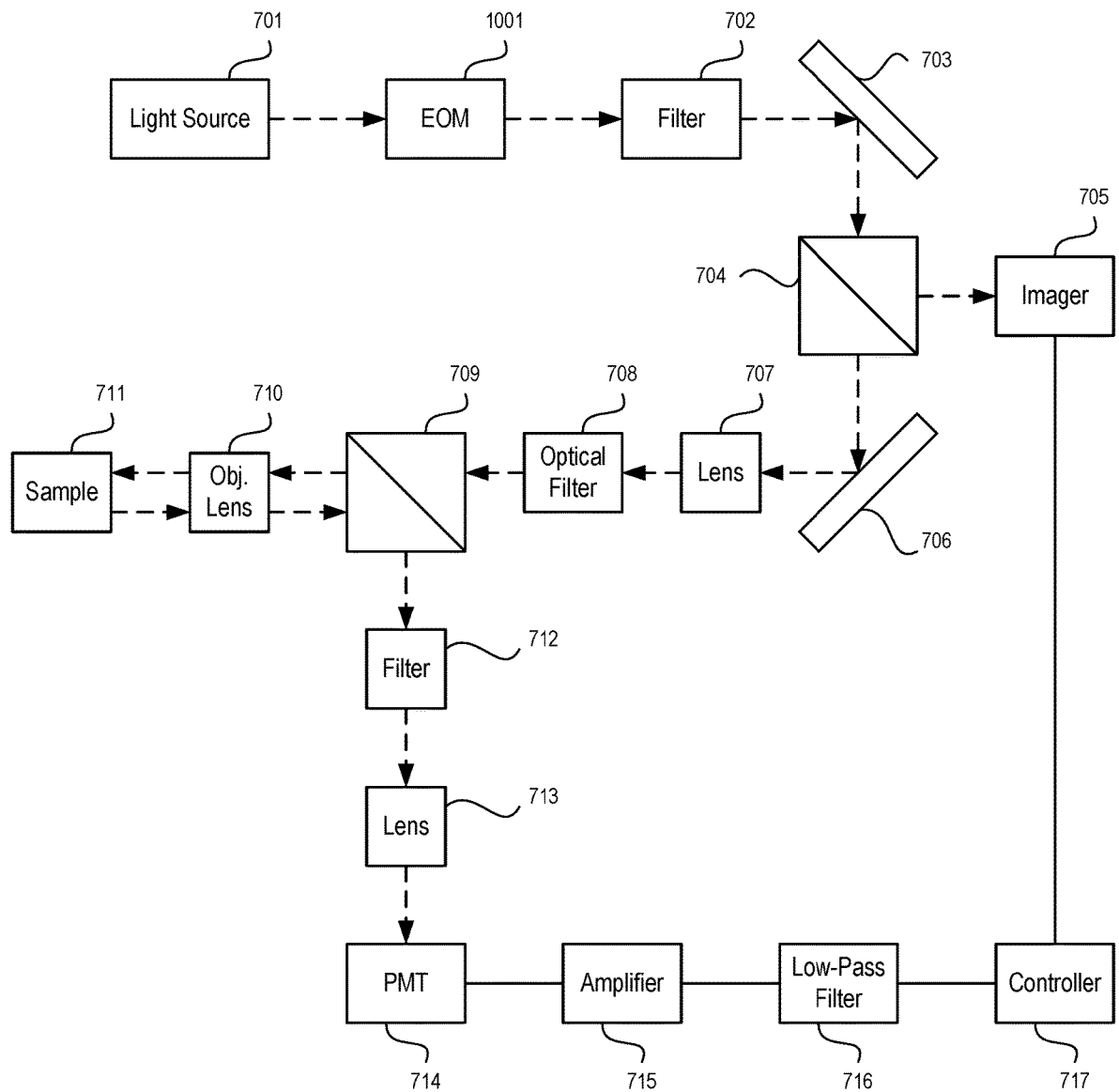
FIG. 10 illustrates another exemplary system for generating output images according to various aspects of the present disclosure.

FIG. 10 illustrates an exemplary system for generating SOS output images. In some aspects of the present disclosure, the system is a microscope. In FIG. 10, dashed lines between elements represent optical paths and solid lines between elements represent operative connections such as physical, electric, and electromagnetic connections (such as via cables or wireless protocols). Some of the elements of FIG. 10 are the same as or similar to corresponding elements of FIG. 7, and are thus represented by the same reference numeral. As illustrated in FIG. 10, a light source 701 emits light through an EOM 1001, which modulates an intensity of the light, to a filter 702, such as a long-pass filter to block ambient light. A mirror 703 reflects the light to a beam splitter 704, such as a glass slide, which sends a first portion of the light to an imager 705 (which generates an emission signal) and a second portion of the light to a mirror 706, such as a scan mirror. The light then passes through a lens 707, and an optical filter 708, which may expand the beam of light to overfill the back aperture of an objective lens 709, which creates a diffraction-limited spot on the sample 711. The sample fluoresces, sending light through the objective lens 710 to be reflected by a dichroic mirror 709 and then filtered through a filter 712 to eliminate residual excitation. The light then passes through a lens 713 and is collected by a PMT 714 to generate an excitation signal. In some exemplary aspects of the present disclosure, the system may include more or fewer optical components such as filters and lenses in order to impart particularly-desired beam shaping or characteristics. The light source 701 is preferably a laser light source, such as a mode-locked Ti:sapphire laser.

The excitation signal is amplified by an amplifier 715 and filtered by a low-pass filter 716. Both the amplified and filtered excitation signal and the emission signal are received by a controller 717, such as a computer or a processor of a microscope. The emission signal corresponds to the excitation intensity I(t) above, and the excitation signal corresponds to the fluorescence intensity F(t) above. The controller 717 may include a memory to store the emission and excitation signals, as well as any calculation results; input and output terminals, such as a data acquisition (DAQ) card; one or more processors; communication circuitry; user interfaces or I/O devices; and the like. The controller 717 may be configured to perform various calculations, including the calculation of super-resolution output images based on a number of raw harmonic images. The calculations may be performed by hardware components of the controller 717, software modules of the controller 717, or a combination of hardware and software. In some aspects of the present disclosure, the controller 717 may send data to a remote computing device such as a server which performs the calculations.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The present disclosure may be implemented in any one or more of the following configurations:

(1) A method of generating an output microscopy image, comprising: obtaining a plurality of raw fluorescence images, respective ones of the plurality of raw fluorescence images obtained by exciting a sample using a light source at a respective irradiance value in a weak saturation region of the sample, and capturing the respective raw fluorescence image; applying a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained; and linearly combining the plurality of weighted fluorescence images, thereby generating the output image having a resolution greater than a diffraction limit, wherein respective raw fluorescence images correspond to irradiance values different from one another.

(2) The method according to (1), wherein applying the plurality of weights includes: extracting an image characteristic value from a respective raw fluorescence image, determining a weight value based on the respective irradiance value, and multiplying the image characteristic value by the weight value.

(3) The method according to (2), wherein the image characteristic value is representative of a fluorescence intensity of the respective raw fluorescence image.

(4) The method according to (2) or (3), wherein the image characteristic value is representative of a harmonic of the respective raw fluorescence image in the frequency domain.

(5) The method according to any one of (1) to (4), wherein obtaining the plurality of raw fluorescence images further includes modulating a light from the light source with a periodic signal.

(6) The method according to any one of (1) to (5), wherein obtaining the plurality of raw fluorescence images further includes performing a blind deconvolution on the respective raw fluorescence image.

(7) The method according to any one of (1) to (6), wherein the plurality of raw fluorescence images is two raw fluorescence images including a first raw fluorescence image and a second raw fluorescence image, obtaining the first raw fluorescence image includes exciting the sample using the light source at a first irradiance value in the weak saturation region of the sample, and capturing the first raw fluorescence image, and obtaining the second raw fluorescence image includes exciting the sample using the light source at a second irradiance value in the weak saturation region of the sample, and capturing the second raw fluorescence image, wherein the second irradiance value is about 1.2 times the first irradiance value.

(8) A non-transitory computer-readable medium storing instructions that, when executed by a processor, cause the processor to perform operations comprising: obtaining a plurality of raw fluorescence images, respective ones of the plurality of raw fluorescence images obtained by exciting a sample using a light source at a respective irradiance value in a weak saturation region of the sample, and capturing the respective raw fluorescence image; applying a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained; and linearly combining the plurality of weighted fluorescence images, thereby generating the output image having a resolution greater than a diffraction limit, wherein respective raw fluorescence images correspond to irradiance values different from one another.

(9) The non-transitory computer-readable medium according to (8), wherein applying the plurality of weights includes: extracting an image characteristic value from a respective raw fluorescence image, determining a weight value based on the respective irradiance value, and multiplying the image characteristic value by the weight value.

(10) The non-transitory computer-readable medium according to (9), wherein the image characteristic value is representative of a fluorescence intensity of the respective raw fluorescence image.

(11) The non-transitory computer-readable medium according to (9) or (10), wherein the image characteristic value is representative of a harmonic of the respective raw fluorescence image in the frequency domain.

(12) The non-transitory computer-readable medium according to any one of (8) to (11), wherein obtaining the plurality of raw fluorescence images further includes modulating a light from the light source with a periodic signal.

(13) The non-transitory computer-readable medium according to any one of (8) to (12), wherein obtaining the plurality of raw fluorescence images further includes performing a blind deconvolution on the respective raw fluorescence image.

(14) The non-transitory computer-readable medium according to any one of (8) to (13), wherein the plurality of raw fluorescence images is two raw fluorescence images including a first raw fluorescence image and a second raw fluorescence image, obtaining the first raw fluorescence image includes exciting the sample using the light source at a first irradiance value in the weak saturation region of the sample, and capturing the first raw fluorescence image, and obtaining the second raw fluorescence image includes exciting the sample using the light source at a second irradiance value in the weak saturation region of the sample, and capturing the second raw fluorescence image, wherein the second irradiance value is about 1.2 times the first irradiance value.

(15) A microscopy system, comprising: a light source configured to excite a sample; an imaging device configured to obtain a plurality of raw fluorescence images, respective ones of the plurality of raw fluorescence images obtained by exciting the sample using the light source at a respective irradiance value in a weak saturation region of the sample, and capturing the respective raw fluorescence image; and a controller configured to: apply a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained, and linearly combine the plurality of weighted fluorescence images, thereby generating the output image having a resolution greater than a diffraction limit, wherein respective raw fluorescence images correspond to irradiance values different from one another.

(16) The microscopy system according to (15), wherein applying the plurality of weights includes: extracting an image characteristic value from a respective raw fluorescence image, determining a weight value based on the respective irradiance value, and multiplying the image characteristic value by the weight value.

(17) The microscopy system according to (16), wherein the image characteristic value is representative of a fluorescence intensity of the respective raw fluorescence image.

(18) The microscopy system according to (16) or (17), wherein the image characteristic value is representative of a harmonic of the respective raw fluorescence image in the frequency domain.

(19) The microscopy system according to any one of (15) to (18), wherein the controller is further configured to modulate a light from the light source with a periodic signal.

(20) The microscopy system according to any one of (15) to (19), wherein the controller is further configured to perform a blind deconvolution on the respective raw fluorescence image.

What is claimed is:

1. A method of generating an output microscopy image, comprising:
   obtaining a plurality of raw fluorescence images, respective ones of the plurality of raw fluorescence images obtained by exciting a sample using a light source at a respective irradiance value in a weak saturation region of the sample, and capturing the respective raw fluorescence image;
   applying a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained; and
   linearly combining the plurality of weighted fluorescence images, thereby generating the output image having a resolution greater than a diffraction limit,
   wherein respective raw fluorescence images correspond to irradiance values different from one another, and
   wherein applying the plurality of weights includes:
      extracting an image characteristic value from a respective raw fluorescence image,
      determining a weight value based on the respective irradiance value, and
      multiplying the image characteristic value by the weight value.

2. The method according to claim 1, wherein the image characteristic value is representative of a fluorescence intensity of the respective raw fluorescence image.

3. The method according to claim 2, wherein the image characteristic value is representative of a harmonic of the respective raw fluorescence image in the frequency domain.

4. The method according to claim 1, wherein obtaining the plurality of raw fluorescence images further includes modulating a light from the light source with a periodic signal.

5. The method according to claim 1, wherein obtaining the plurality of raw fluorescence images further includes performing a blind deconvolution on the respective raw fluorescence image.

6. A method of generating an output microscopy image, comprising:
   obtaining a plurality of raw fluorescence images, respective ones of the plurality of raw fluorescence images obtained by exciting a sample using a light source at a respective irradiance value in a weak saturation region of the sample, and capturing the respective raw fluorescence image;
   applying a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained; and
   linearly combining the plurality of weighted fluorescence images, thereby generating the output image having a resolution greater than a diffraction limit,
   wherein respective raw fluorescence images correspond to irradiance values different from one another, wherein
   the plurality of raw fluorescence images is two raw fluorescence images including a first raw fluorescence image and a second raw fluorescence image,
   obtaining the first raw fluorescence image includes exciting the sample using the light source at a first irradiance value in the weak saturation region of the sample, and capturing the first raw fluorescence image, and
   obtaining the second raw fluorescence image includes exciting the sample using the light source at a second irradiance value in the weak saturation region of the sample, and capturing the second raw fluorescence image,
   wherein the second irradiance value is about 1.2 times the first irradiance value.

7. A non-transitory computer-readable medium storing instructions that, when executed by a processor, cause the processor to perform operations comprising:
   obtaining a plurality of raw fluorescence images, respective ones of the plurality of raw fluorescence images obtained by exciting a sample using a light source at a respective irradiance value in a weak saturation region of the sample, and capturing the respective raw fluorescence image;
   applying a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained; and
   linearly combining the plurality of weighted fluorescence images, thereby generating the output image having a resolution greater than a diffraction limit,
   wherein respective raw fluorescence images correspond to irradiance values different from one another, and
   wherein applying the plurality of weights includes:
      extracting an image characteristic value from a respective raw fluorescence image,
      determining a weight value based on the respective irradiance value, and
      multiplying the image characteristic value by the weight value.

8. The non-transitory computer-readable medium according to claim 7, wherein the image characteristic value is representative of a fluorescence intensity of the respective raw fluorescence image.

9. The non-transitory computer-readable medium according to claim 7, wherein the image characteristic value is representative of a harmonic of the respective raw fluorescence image in the frequency domain.

10. The non-transitory computer-readable medium according to claim 7, wherein obtaining the plurality of raw fluorescence images further includes modulating a light from the light source with a periodic signal.

11. The non-transitory computer-readable medium according to claim 7, wherein obtaining the plurality of raw fluorescence images further includes performing a blind deconvolution on the respective raw fluorescence image.

12. A non-transitory computer-readable medium storing instructions that, when executed by a processor, cause the processor to perform operations comprising:
   obtaining a plurality of raw fluorescence images, respective ones of the plurality of raw fluorescence images obtained by exciting a sample using a light source at a respective irradiance value in a weak saturation region of the sample, and capturing the respective raw fluorescence image;
   applying a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained; and
   linearly combining the plurality of weighted fluorescence images, thereby generating the output image having a resolution greater than a diffraction limit,
   wherein respective raw fluorescence images correspond to irradiance values different from one another, wherein
   the plurality of raw fluorescence images is two raw fluorescence images including a first raw fluorescence image and a second raw fluorescence image,
   obtaining the first raw fluorescence image includes exciting the sample using the light source at a first irradiance value in the weak saturation region of the sample, and capturing the first raw fluorescence image, and
   obtaining the second raw fluorescence image includes exciting the sample using the light source at a second irradiance value in the weak saturation region of the sample, and capturing the second raw fluorescence image,
   wherein the second irradiance value is about 1.2 times the first irradiance value.

13. A microscopy system, comprising:
   a light source configured to excite a sample;
   an imaging device configured to obtain a plurality of raw fluorescence images, respective ones of the plurality of raw fluorescence images obtained by exciting the sample using the light source at a respective irradiance value in a weak saturation region of the sample, and capturing the respective raw fluorescence image; and
   a controller configured to:
      apply a plurality of weights to the plurality of raw fluorescence images in a one-to-one correspondence so as to generate a plurality of weighted fluorescence images, wherein a respective weight is based on the respective irradiance value at which the corresponding raw fluorescence image was obtained, and
      linearly combine the plurality of weighted fluorescence images, thereby generating the output image having a resolution greater than a diffraction limit,
   wherein respective raw fluorescence images correspond to irradiance values different from one another, and
   wherein applying the plurality of weights includes:
      extracting an image characteristic value from a respective raw fluorescence image,
      determining a weight value based on the respective irradiance value, and
      multiplying the image characteristic value by the weight value.

14. The microscopy system according to claim 13, wherein the image characteristic value is representative of a fluorescence intensity of the respective raw fluorescence image.

15. The microscopy system according to claim 13, wherein the image characteristic value is representative of a harmonic of the respective raw fluorescence image in the frequency domain.

16. The microscopy system according to claim 13, wherein the controller is further configured to modulate a light from the light source with a periodic signal.

17. The microscopy system according to claim 13, wherein the controller is further configured to perform a blind deconvolution on the respective raw fluorescence image.

* * * * *